United States Patent
Komatsu et al.

(10) Patent No.: US 8,441,776 B2
(45) Date of Patent: May 14, 2013

(54) SOLID ELECTROLYTIC CAPACITOR COMPRISING TWO PROTECTIVE POLYMER FILMS

(75) Inventors: Keiichi Komatsu, Hirakata (JP); Koichi Nishimura, Kadoma (JP); Takeshi Sano, Takatsuki (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 204 days.

(21) Appl. No.: 13/033,122

(22) Filed: Feb. 23, 2011

(65) Prior Publication Data

US 2011/0205690 A1      Aug. 25, 2011

(30) Foreign Application Priority Data

Feb. 25, 2010   (JP) .................. 2010-040677

(51) Int. Cl.
*H01G 4/06*       (2006.01)
*H01G 5/013*      (2006.01)
*H01G 9/00*       (2006.01)
*H01G 9/02*       (2006.01)

(52) U.S. Cl.
USPC .......................................... 361/524; 361/525

(58) Field of Classification Search ............ 361/524, 361/525
See application file for complete search history.

(56) References Cited

U.S. PATENT DOCUMENTS

| | | | | |
|---|---|---|---|---|
| 5,461,537 A * | 10/1995 | Kobayashi et al. | ........... | 361/525 |
| 6,519,137 B1 * | 2/2003 | Nitta et al. | ..................... | 361/525 |
| 6,674,635 B1 * | 1/2004 | Fife et al. | ...................... | 361/523 |
| 7,125,764 B2 * | 10/2006 | Taketani et al. | ............... | 438/239 |
| 7,262,954 B1 * | 8/2007 | Iida et al. | ...................... | 361/528 |
| 7,460,358 B2 * | 12/2008 | Biler | ............................. | 361/523 |
| 8,125,768 B2 * | 2/2012 | Horacek et al. | ............... | 361/532 |
| 8,164,884 B2 * | 4/2012 | Nobuta et al. | ................. | 361/525 |

FOREIGN PATENT DOCUMENTS

| | | | |
|---|---|---|---|
| JP | H02-249221 A | | 10/1990 |
| JP | 05283291 A | * | 10/1993 |
| JP | 2001-307958 A | | 11/2001 |

* cited by examiner

*Primary Examiner* — David M Sinclair
(74) *Attorney, Agent, or Firm* — Marvin A. Motsenbocker; Mots Law, PLLC

(57) ABSTRACT

An aspect of the invention provides a solid electrolyte capacitor that comprises: an anode body; a dielectric layer formed on the surface of the anode body; a first polymer film formed on the dielectric layer and containing a first polymer; a second polymer film formed on the first polymer film and containing a second polymer that is different from the first polymer; a conducting polymer layer formed on the second polymer film and containing a conducting polymer that is different from the second polymer; and a cathode layer formed on the conducting polymer layer, wherein the first polymer film has a larger work function than that of the conducting polymer layer.

12 Claims, 2 Drawing Sheets

SOLID ELECTROLYTIC CAPACITOR COMPRISING TWO PROTECTIVE POLYMER FILMS

CROSS REFERENCE TO RELATED APPLICATIONS

This application claims priority based on 35 USC 119 from prior Japanese Patent Application No. 2010-040677 filed on Feb. 25, 2010, entitled "SOLID ELECTROLYTE CAPACITOR", the entire contents of which are incorporated herein by reference

BACKGROUND OF THE INVENTION

1. Field of the Invention

The invention relates to a solid electrolyte capacitor using a conducting polymer as an electrolyte layer.

2. Description of Related Art

Solid electrolyte capacitors have wide applications in such various electronic apparatus as personal computers, mobile electronic apparatus, game machines, and servers. The solid electrolyte capacitors are used mainly for the purpose of smoothing the voltage in power supply circuits and removing current noise.

A typical electronic apparatus includes plural integrated circuits, such as ICs and LSIs. The operation of each IC or LSI causes instantaneous current flow, resulting in a drop of voltage. Thus, in order to operate the electronic apparatus normally by preventing such voltage drop from affecting peripheral circuits and from generating noise, it is necessary to provide, around the ICs and LSIs, capacitors to compensate for the voltage drop or to remove AC noise of high frequencies.

Such capacitors provided to smooth power-supply voltage or to remove noise are also called decoupling capacitors, bypass capacitors, or the like, and are required to have properties of providing high capacitance and having low equivalent series resistances (ESR) in a wide frequency range.

Electrolytic capacitors are a type of capacitor meeting the above requirements. An electrolytic capacitor has an anode body made of a metal such as aluminum, tantalum, or niobium, and includes a dielectric coating formed by transforming the surface of the metal into an insulator through a chemical treatment such as an anodizing process. The electrolytic capacitor uses as a cathode an electrolytic solution or a solid conducting material. Solid electrolyte capacitors are excellent in reliability for a long time because there is no risk of leaking or evaporating of the electrolytic solution.

Some solid electrolyte capacitors include an electrolyte layer made of such inorganic material as manganese dioxide while some others include an electrolyte layer made of such organic material as a conducting polymer or a charge-transfer complex. Organic solid electrolyte capacitors employing a conducting material or charge-transfer complex are often used as decoupling capacitors or bypass capacitors because of their low ESR values.

Since electronic apparatus of recent years, such as computers, have been undergoing rapid progress in size reduction and increased speed, the specs required for the capacitors used in such electronic circuits as mother boards have become much higher than before. Capacitors smaller in size and capable of providing higher capacitance are in demand.

In the meantime, laptop computers and mobile electronic apparatus are strongly expected to consume less power to operate with their batteries for a longer time, and therefore require capacitors having a very small leakage current.

In addition, capacitors need to be highly reliable, and are required to keep their insulating performance and keep functioning as a capacitor without causing any trouble such as short a circuit even if they operate with voltages applied under various temperature conditions.

According to the basic principles of capacitors, a capacitor providing a higher capacitance needs to increase the surface area, decrease the thickness of the dielectric layer, or increase the dielectric constant of the dielectric layer. With the size of the capacitor and the material for the dielectric layer constrained, however, reducing the thickness of the dielectric layer is an important means for increasing the capacitance.

Reducing the thickness of the dielectric layer, however, more likely causes leakage current to flow through the thinner portions or defective portions of the dielectric layer. In addition, the thinner dielectric layer lowers the breakdown voltage of the capacitor under normal or instantaneous application of a voltage. The lower breakdown voltage more likely causes such malfunctions as short circuits.

Patent Document 1 (JP 2-249221A) proposes that either an ion-exchanger polymer compound, such as polystyrene sulfonate and polyvinyl sulfonate, or a polymer compound such as polyvinyl alcohol and polyvinyl chloride is formed on a dielectric oxide coat; and that a conducting polymer compound is formed on the aforementioned polymer compound. JP 2-249221A states that the formation of the polymer compound helps the conducting polymer compound to adhere more strongly to the dielectric oxide coat and allows the conducting polymer compound layer to be formed flatter and smoother.

JP 2-249221A, however, does not disclose any technique enabling the fabrication of a solid electrolyte capacitor that has a smaller leakage current, that is less likely to cause malfunction, and that is highly reliable even when used under higher-temperature and load conditions.

In addition, Patent Document 2 (JP 2001-307958A) proposes a technique including: forming a dielectric oxide coat; then forming a conducting polymer layer as a pre-coat layer; then forming a first conducting polymer layer by electropolymerization and forming a second and a third conducting polymer layer by chemical polymerization.

JP 2001-307958A, however, still fails to disclose any technique enabling the fabrication of a solid electrolyte capacitor that has a smaller leakage current, and that is highly reliable even when used under higher-temperature and load conditions.

SUMMARY OF THE INVENTION

An aspect of the invention provides a solid electrolyte capacitor that comprises: an anode body; a dielectric layer formed on the surface of the anode body; a first polymer film formed on the dielectric layer and containing a first polymer; a second polymer film formed on the first polymer film and containing a second polymer that is different from the first polymer; a conducting polymer layer formed on the second polymer film and containing a conducting polymer that is different from the second polymer; and a cathode layer formed on the conducting polymer layer, wherein the first polymer film has a larger work function than that of the conducting polymer layer.

In the solid electrolyte capacitor, the first and second polymer films are formed between the dielectric layer and the conducting polymer layer. The second polymer film, which is formed on the first polymer film, prevents the solvent used for forming the conducting polymer layer from re-dissolving the first polymer film. In addition, the work function of the first polymer film is set to be larger than that of the conducting polymer layer. Accordingly, the leakage current can be reduced, and reliability under high-temperature and load conditions can be increased.

It is preferable that the first polymer film has a larger work function than that of the conducting polymer layer by 0.3 eV or more, since the leakage current can be reduced further, and reliability under high-temperature and load conditions can be increased further.

It is preferable that the second polymer film has a larger work function than that of the conducting polymer layer, since the leakage current can be reduced further, and reliability under high-temperature and load conditions can be increased further.

It is preferable that the first polymer film mainly contains a water-soluble polymer. It is also preferable that the second polymer film mainly contains a non-water-soluble polymer. The solvent used for forming the conducting polymer layer made generally of a water-soluble conducting polymer can be prevented from re-dissolving the first polymer film. In addition, as generally having high work functions, a water-soluble polymer is preferably used as the polymer for forming the first polymer film.

In addition, the total thickness of the first and second polymer films is preferably within a range from 5 nm to 50 nm. If the total thickness of the first and second polymer films is too thin, the dielectric layer cannot be covered sufficiently. Thus, the first and second polymer films have only a small effect of reducing the leakage current in some cases. Conversely, if the total thickness of the first and second polymer films is too thick, the conducting polymer fails to be formed inside. Thus, the capacitance is lowered in some cases.

In addition, it is preferable that the ratio of the thickness of the first polymer film to the thickness of the second polymer film (first polymer film:second polymer film) is within a range from 3:7 to 7:3, further preferably within a range from 4:6 to 6:4. By setting the ratio within the above range, the leakage current can be reduced further, and reliability under high-temperature and load conditions can be increased further.

DETAILED DESCRIPTION OF EMBODIMENTS

Figure 1:
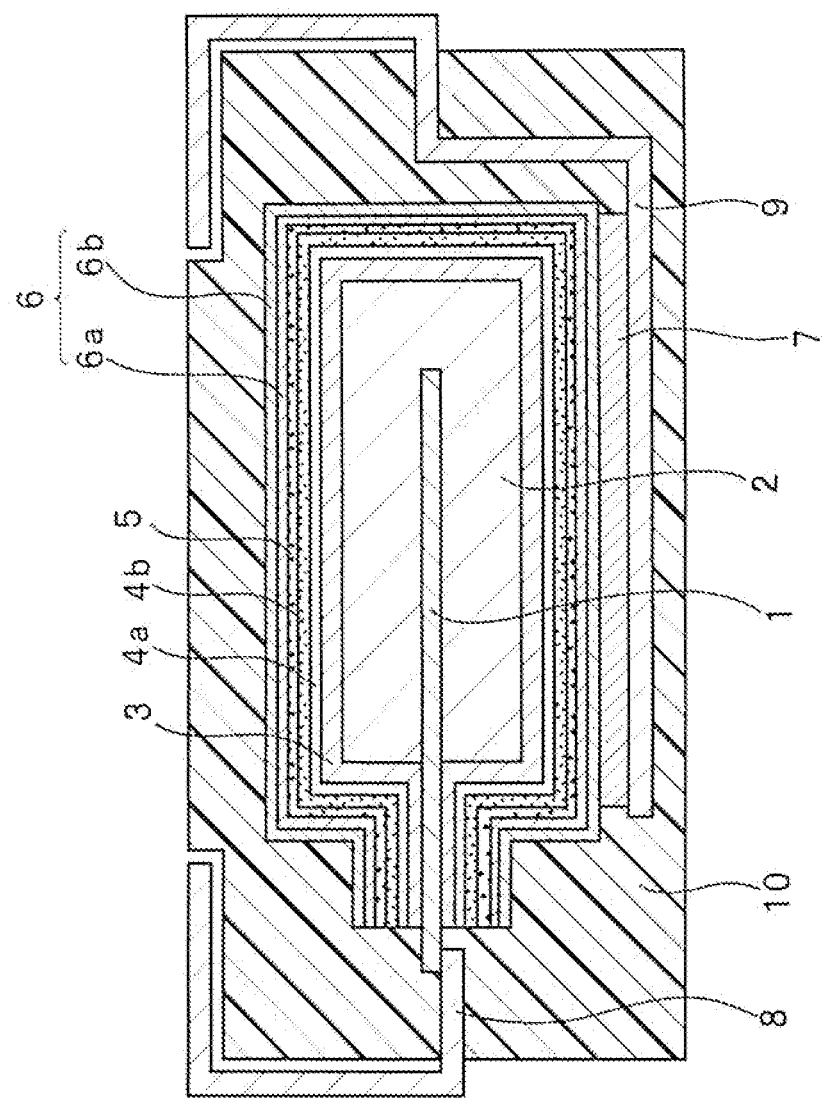
FIG. 1 is a schematic sectional diagram illustrating a solid electrolyte capacitor according to an embodiment.

Embodiments of the invention are explained by referring to drawings. In the respective drawings referenced herein, the same constituents are designated by the same reference numerals and duplicate explanation concerning the same constituents is omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another.

Prepositions, such as "on", "over" and "above" may be defined with respect to a surface, for example a layer surface, regardless of that surface's orientation in space. The preposition "above" may be used in the specification and claims even if a layer is in contact with another layer. The preposition "on" may be used in the specification and claims when a layer is not in contact with another layer, for example, when there is an intervening layer between them.

FIG. 1 is a schematic sectional diagram illustrating a solid electrolyte capacitor according to the embodiment. As FIG. 1 shows, anode lead 1 is buried in anode body 2. Anode body 2 is fabricated by forming a predetermined shape with powder of either a valve metal or an alloy mainly containing a valve metal, and then sintering the structure thus formed. Accordingly, anode body 2 of the embodiment is made of a porous material. Though not illustrated in FIG. 1, the porous material has plural fine pores that communicatively connect the inside of the porous material to the outside thereof. Anode body 2 thus fabricated has substantially a cuboid external form in this embodiment.

The valve metal of which anode body 2 is made is not limited to a particular type as long as the valve metal can be used in solid electrolyte capacitors. Some of the usable valve metals are tantalum, niobium, titanium, aluminum, hafnium, zirconium, zinc, tungsten, bismuth, and antimony. Of all these metals, tantalum, niobium, titanium, and aluminum are particularly preferable for the higher dielectric constants of their oxides and the easier availability of such raw materials. Some of the usable alloys mainly containing a valve metal are alloys each containing two or more valve metals such as tantalum and niobium, and alloys each containing both a valve metal and other type of metal. If an alloy containing a valve metal and other type of metal is used, the proportion of the valve metal is preferably 50 atom % or higher.

A foil of a valve metal or of an alloy containing a valve metal may also be used as anode body 2. To increase the surface area of the anode body 2, the metal foil or the alloy foil may be etched or rolled. Alternatively, plural foils of such type may be stacked one upon another. In addition, the foil or the foils may be sintered together with the powder metal to form a unitary body.

Dielectric layer 3 is formed to cover the surface of anode body 2. Dielectric layer 3 is formed over the surfaces of the pores of anode body 2 as well. FIG. 1 schematically shows dielectric layer 3 formed on the external surfaces of anode body 2, but shows no dielectric layer 3 formed over the surfaces of the pores of the porous material. Dielectric layer 3 can be formed by oxidizing the surfaces of anode body 2 by anodization or like methods.

First polymer film 4a is formed on the surfaces of dielectric layer 3. Though not illustrated in FIG. 1, first polymer film 4a is also formed over the surfaces of the pores in anode body 2.

Second polymer film 4b is formed on the surfaces of first polymer film 4a. Though not illustrated in FIG. 1, second polymer film 4b is also formed on the surfaces of the first polymer film 4a over the surfaces of the pores in anode body 2.

Conducting polymer layer 5 is formed on the surfaces of second polymer film 4b. Conducting polymer layer 5 is also formed over the surfaces of the pores in anode body 2.

FIG. 1 schematically shows first polymer film 4a, second polymer film 4b, and conducting polymer layer 5, but shows none of those films and layer formed over the surfaces of the pores in the porous material.

Carbon layer 6a is formed on conducting polymer layer 5 formed to cover the external surfaces of anode body 2, and silver layer 6b is formed on carbon layer 6a. Carbon layer 6a can be formed by applying carbon paste whereas silver layer 6b can be formed by applying silver paste. Carbon layer 6a and silver layer 6b together form cathode layer 6.

Cathode terminal 9 is connected to silver layer 6b with conducting adhesive layer 7 provided in between. In addition, anode terminal 8 is connected to anode lead 1. Mold-resin outer package 10 is formed in such a manner that end portions of both anode terminal 8 and cathode terminal 9 can be taken out of mold-resin outer package 10.

The solid electrolyte capacitor of the embodiment is formed as described thus far.

Figure 2:
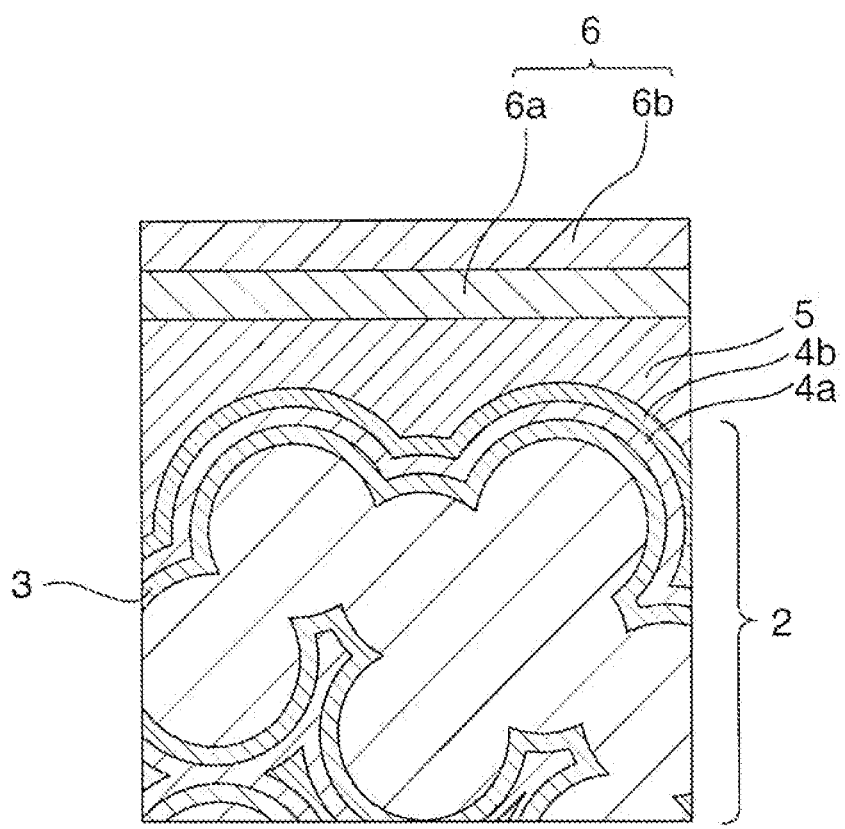
FIG. 2 is a schematic sectional diagram illustrating, in an enlarged manner, the vicinity of the surface of the anode body of the solid electrolyte capacitor illustrated in FIG. 1.

FIG. 2 is a schematic sectional diagram illustrating, in an enlarged manner, the vicinity of the surface of anode body 2 of the solid electrolyte capacitor illustrated in FIG. 1. As FIG. 2 shows, anode body 2 is made of a porous material and has fine pores formed therein. Dielectric layer 3 is formed on the surfaces of anode body 2 whereas first polymer film 4a and second polymer film 4b are formed on and over dielectric layer 3.

The polymer forming first polymer film 4a is determined in such a manner that first polymer film 4a has a larger work function than that of conducting polymer layer 5. The work function of first polymer film 4a is preferably larger than that of conducting polymer layer 5 by 0.3 eV or more. In general, the difference between the work function of first polymer film 4a and that of conducting polymer layer 5 is preferably within a range from 0.3 eV to 2.0 eV.

It is more preferable that the work function of first polymer film 4a is 6.0 eV or more, and further preferable that the work function of first polymer film 4a is in a range from 6.0 eV to 7.0 eV.

In addition, the polymer forming first polymer film 4a is preferably water-soluble. Some of such water-soluble polymers usable for this purpose are vinyl polymer materials. Some of the specific examples of such vinyl polymer materials are polyvinyl alcohol and polyacrylamide. In addition, an example of the water-soluble polymers that can be used for forming first polymer film 4a is polyethylene glycol (PEG).

Polymers that are preferably used for forming first polymer film 4a are ones with substituent groups such as hydroxyl group because of their higher solubility in water-based solvents.

The polymer forming second polymer film 4b preferably has a larger work function than that of conducting polymer layer 5, more preferably larger by 0.2 eV or more.

In addition, the work function of the polymer forming second polymer film 4b is preferably within a range between the work function of first polymer film 4a and that of conducting polymer layer 5. It is preferable that second polymer film 4b has a smaller work function than that of first polymer film 4a by 0.2 eV or more. By setting the work function of second polymer film 4b in the above manner, the leakage current can be reduced further, and reliability under high-temperature and load conditions can be increased.

The polymer forming second polymer film 4b is preferably non-water-soluble. By forming first polymer film 4a with a water-soluble polymer and second polymer film 4b with a non-water-soluble polymer, the solvent to be used for forming second polymer film 4b is prevented from dissolving first polymer film 4a when second polymer film 4b is formed.

In addition, conducting polymer layer 5 is often formed in an aqueous solution in which the monomers of the conducting polymer are dissolved. Accordingly, when conducting polymer layer 5 is formed, second polymer film 4b formed with a non-water-soluble polymer is hardly dissolved into the aqueous solution. Thus, first polymer film 4a covered with second polymer film 4b can be prevented from being re-dissolved.

Polymers forming second polymer film 4b are exemplified as follows: polyvinyl carbazole; polyvinyl phenol; polyfluorene and a derivative thereof; fluorene copolymer; polyphenylene and a derivative thereof; phenylene copolymer; polyparaphenylene vinylene and a derivative thereof; phenylene vinylene copolymer; polypyridine and a derivative thereof; and pyridine copolymer.

Derivatives with substituent groups such as alkyl chains and alkoxy groups increase their solubility in organic solvents. Accordingly, such derivatives are preferable in view of their excellent workability. From the viewpoint of the work function, if the polymer contains derivatives of six-membered ring—in particular, of aromatic benzene or pyridine—in the main chain, electronically stable six-membered ring increases the work function and thus such polymer is preferable. Fluorene has a molecular structure with six-membered rings and a five-membered ring condensed together, and the electronic stability of the condensed rings increases the work function. Polymers containing polyfluorene with soluble substituent groups and polymers formed by copolymerizing fluorine and other aryl groups are highly soluble in organic solvents and have adequately large work functions ranging from 5 eV to 6 eV. Accordingly, such polymers are appropriate for forming second polymer film 4b.

In addition, if polyparaphenylene vinylene derivatives, derivatives of polyphenylene, and copolymers of polyphenylene contain substituent groups that increase their solubility in organic solvents, such polymers have favorable workability. Accordingly, such polymers are appropriate for forming second polymer film 4b. It is preferable that the total thickness of first polymer film 4a and second polymer film 4b is within a range from 5 nm to 50 nm, as has been described above. In addition, it is preferable that the ratio of the thickness of first polymer film 4a to the thickness of second polymer film 4b (first polymer film 4a:second polymer film 4b) is within a range from 3:7 to 7:3, further preferably within a range from 4:6 to 6:4.

Conducting polymer layer 5 can be made, for example, of a material that is used for forming the conducting polymer layers of ordinary solid electrolyte capacitors. Some examples of such materials are polypyrrole, polythiophene, and polyethylenedioxy thiophene. These polymers doped with some dopants are preferably used for the purpose. Polymers polymerized with molecules containing hetero rings of six-membered ring have high electron-donating abilities, and have smaller work functions than the conducting polymers of other kinds. By adding dopants to these materials, such a high electric conductivity as 0.1 S/cm to 1000 S/cm approximately can be achieved. To reduce the ESR of the capacitor, use of highly conductive materials is preferable.

Conducting polymer layer 5 may have a layered structure with plural layers stacked one upon another. For example, a first conducting polymer layer may be formed on second polymer film 4b by chemical polymerization, and then a second conducting polymer layer may be formed on the first conducting polymer layer by electropolymerization using the first conducting polymer layer as an electrode. As described earlier, conducting polymer layer 5 is preferably also formed over the surface of the pores in anode body 2.

In this embodiment, both first polymer film 4a and second polymer film 4b are formed between dielectric layer 3 and conducting polymer layer 5, while the work function of first polymer film 4a is set to be larger than that of conducting polymer layer 5. Forming both first polymer film 4a and second polymer film 4b between dielectric layer 3 and conducting polymer layer 5 can decrease the leakage current and prevent malfunctions from occurring under high-temperature and load conditions for reasons that have not been revealed yet in detail. The inventors speculate the reasons as follows.

If dielectric layer 3 is a perfect insulator, no current whatsoever flows even with a certain voltage applied between anode body 2 and cathode layer 6. In practice, however, a small amount of current (leakage current) flows. Various reasons have been given for the causes of the occurrence of leakage current. Two well-known examples of leakage current are one that flows through the dielectric layer and one that flows outside of the dielectric layer bypassing the dielectric layer. To be more specific, such leakage currents may be classified, for example, as follows: one that flows at the impurity level in the dielectric layer; one that flows, like the tunnel current, through the dielectric layer; one that flows through defective portions of the dielectric layer; and one that flows through the path outside of the dielectric layer.

The thinner the dielectric layer becomes, the more easily the leakage current flows. In particular, the current flowing through the dielectric layer increases as the dielectric layer becomes thinner. An energy barrier called Schottky barrier exists between the conducting polymer layer and the dielectric layer, and does not allow electrons to travel easily beyond this barrier. If, however, the dielectric layer is thin and is applied with a certain voltage, the energy band is curved and thus it becomes more likely that the electrons penetrate the conducting polymer layer and flow from the conducting polymer layer to the anode body. In practice, the impurity level and the defects seem to have great influences on the leakage current, but similar principles can describe most of the phenomenon By simply increasing the thickness of the dielectric layer, the leakage current can be reduced. Increasing the thickness the dielectric layer, however, decreases the capacitance. In this embodiment, first polymer film 4a with a large work function is interposed between dielectric layer 3 and conducting polymer layer 5. Interposing first polymer film 4a in between is considered to restrain electrons from flowing to the anode side due to traveling beyond the energy barrier between dielectric layer 3 and conducting polymer layer 5, or passing through the impurity level and defects in the dielectric layer 3.

Note that, in this embodiment, a large work function means a large absolute value of the work function. In the embodiment, the work function of first polymer film 4a is larger than that of conducting polymer layer 5. In addition, the work function of second polymer film 4b has a value within a range between the work function of first polymer film 4a and that of conducting polymer layer 5.

In this way, the large work function of first polymer film 4a, which is in contact with dielectric layer 3 restrain electrons from flowing from conducting polymer 5 into anode body 2 through first polymer film 4a and dielectric layer 3. For this reason, according to the embodiment, the leakage current can be reduced. In addition, even under high-temperature and load conditions, first polymer film 4a restrains the current from flowing from conducting polymer layer 5 to anode body 2 beyond the high energy barrier of dielectric layer 3. Accordingly, when the capacitor is used at a high temperature and/or is applied with a load of certain voltage, no large current flows between anode body 2 and cathode layer 6, and thereby it is possible to prevent avalanche current that would cause such malfunctions as short circuits.

As has been described thus far, the embodiment can provide a highly-reliable solid electrolyte capacitor with a smaller leakage current.

EXAMPLES

Specific examples of the invention are described below, but the invention is not limited to the following examples. Note that the work functions cited in the following examples and comparative examples are absolute values of the work functions.

Example 1

(Step 1)
Metal powder of tantalum is used as the powder of the valve metal. The tantalum powder is formed into a shape while an anode lead made of tantalum is buried in the tantalum powder. Then, the structure thus formed is sintered at approximately 1200° C. in a vacuum atmosphere, and a tantalum sintered-body element to be used as an anode body is thus obtained.

The surfaces of the tantalum sintered-body element are anodized in a phosphoric acid aqueous solution of 0.05 wt % at a constant voltage of 10 V, and thus a dielectric layer is formed.

(Step 2)
Subsequently, the resultant element is dipped in a solution prepared by dissolving polyvinyl alcohol (PVA) in pure water in such a manner that the solution has a PVA concentration of 0.1 wt %. Then, the element is dried to sufficiently remove the solvent, and a first polymer film is thus formed. The work function of the polyvinyl alcohol is measured with a photoelectronic spectrometer, and a value of 6.2 eV is obtained. The thickness of the first polymer film is calculated from the concentration and the porosity of the element, and a thickness of 10 nm is obtained.

(Step 3)
Further, the resultant element is dipped in a solution prepared by dissolving polyvinyl carbazole (PVCz) in toluene in such a manner that the solution has a PVCz concentration of 0.1 wt %. Then, the element is dried to sufficiently remove the solvent, and a second polymer film is thus formed. The work function of the polyvinyl carbazole is measured with a photoelectronic spectrometer, and a value of 5.6 eV is obtained. The thickness of the second polymer film is calculated from the concentration and the porosity of the element, and a thickness of 10 nm is obtained.

(Step 4)
Subsequently, by chemical polymerization followed by electropolymerization or the like, a polypyrrole layer serving as a conducting polymer layer is formed on the second polymer film.

The work function of the polypyrrole is measured with a photoelectronic spectrometer, and a value of 5.0 eV is obtained. Then, by applying carbon paste and silver paste, a cathode layer is formed, and a capacitor element is thus fabricated.

(Step 5)
The capacitor element is mounted on a leadframe terminal, and then the anode lead and the cathode layer of the capacitor are bonded to the frame terminal.

(Step 6)
Subsequently, the capacitor element and the lead frame are overmolded with an epoxy mold resin. After that, the resultant overmolded body is cut into individual capacitor elements, and a tantalum solid electrolyte capacitor is thus fabricated.

Example 2

A solid electrolyte capacitor of Example 2 is fabricated in the same manner as that of Example 1 but with a modification of Step 3 of Example 1 as follows. The element is dipped in a solution prepared by dissolving 9,9-octylfluorene-stilbene-triphenylamine copolymer in toluene in such a manner that the solution has a 9,9-octylfluorene-stilbene-triphenylamine copolymer concentration of 0.1 wt %. Then, the element is dried to sufficiently remove the solvent, and a second polymer film is thus formed. Subsequently, the following steps 4 to 6 are performed in a similar manner to those in Example 1. The work function of the 9,9-octylfluorene-stilbene-triphenylemine copolymer is measured with a photoelectronic spectrometer, and a value of 5.4 eV is obtained. The thickness of the film of 9,9-octylfluorene-stilbene-triphenylamine copolymer is calculated from the concentration and the porosity of the element, and a thickness of 10 nm is obtained.

Example 3

A solid electrolyte capacitor of Example 3 is fabricated in the same manner as that of Example 1 but with a modification of Step 2 of Example 1 as follows. The element is dipped in a solution prepared by dissolving polyethylene glycol (PEG) in pure water in such a manner that the solution has a PEG concentration of 0.1 wt %. Then, the element is dried to sufficiently remove the solvent, and a first polymer film is thus formed. The work function of the polyethylene glycol is measured with a photoelectronic spectrometer, and a value of 6.0 eV is obtained. The thickness of the film of polyethylene glycol (PEG) is calculated from the concentration and the porosity of the element, and a thickness of 10 nm is obtained. Subsequently, the following steps 3 to 6 are performed in a similar manner to those in Example 1.

Example 4

A solid electrolyte capacitor of Example 4 is fabricated in the same manner as that of Example 1 but with a modification of Step 3 of Example 1 as follows. The element is dipped in a solution prepared by dissolving polyacethylene in toluene in such a manner that the solution has a polyacethylene concentration of 0.1 wt %. Then, the element is dried to sufficiently remove the solvent, and a first polymer film is thus formed. The work function of polyacethylene is measured with a photoelectronic spectrometer, and a value of 5.1 eV is obtained. The thickness of the film of polyacethylene is calculated from the concentration and the porosity of the element, and a thickness of 10 nm is obtained.

Example 5

A solid electrolyte capacitor of Example 5 is fabricated in the same manner as that of Example 1 but with a modification of Step 3 of Example 1 as follows. The element is dipped in a solution prepared by dissolving polydiacetylene in toluene in such a manner that the solution has a polydiacetylene concentration of 0.1 wt %. Then, the element is dried to sufficiently remove the solvent, and a first polymer film is thus formed. The work function of polydiacetylene is measured with a photoelectronic spectrometer, and a value of 5.2 eV is obtained. The thickness of the film of polydiacetylene is calculated from the concentration and the porosity of the element, and a thickness of 10 nm is obtained.

Comparative Example 1

A solid electrolyte capacitor is fabricated in a similar manner to Example 1 except that the processes at Steps 2 and 3 are not performed.

Comparative Example 2

A solid electrolyte capacitor is fabricated in a similar manner to Example 1 except that the process at Step 3 is not performed.

Comparative Example 3

A solid electrolyte capacitor is fabricated in a similar manner to Example 1 except that the process at Step 2 is not performed.

Assessment of Capacitors

The capacitance and the value of leakage current of each of the solid electrolyte capacitors fabricated in the above-described examples and comparative examples are measured, and the average of 100 capacitors of each type is calculated for each of the capacitance and the leakage current. The leakage current is measured at room temperature 5 minutes after the application of a voltage of 3.0 V.

Table 1 shows the measurement results. The figures in Table 1 are indices with the capacitance and the leakage current of Comparative Example 1 being 100.

TABLE 1

| | First Polymer Film (Water Soluble) | | Second Polymer Film (Non-Water Soluble) | | Capacitance (Rate) | Leakage Current (Rate) |
|---|---|---|---|---|---|---|
| | | Work Function (eV) | | Work Function (eV) | | |
| Example 1 | PVA | 6.2 | PVCz | 5.6 | 100 | 80 |
| Example 2 | PVA | 5.2 | 9,9-octylfluorene-stilbene-triphenylamine copolymer | 5.4 | 100 | 85 |
| Example 3 | PEG | 6.0 | PVCz | 5.6 | 100 | 85 |
| Example 4 | PVA | 6.2 | polyacethylene | 5.1 | 100 | 88 |
| Example 5 | PVA | 6.2 | polydiacetylene | 5.2 | 100 | 87 |
| Comparative Example 1 | — | — | — | — | 100 | 100 |
| Comparative Example 2 | — | — | PVCz | 5.6 | 100 | 97 |
| Comparative Example 3 | PVA | 6.2 | — | — | 100 | 97 |

Table 1 clearly shows that the capacitor of Example 1 has a smaller leakage current than that of Comparative Example 1. This is probably because the first and the second polymer films which have larger work functions than that of polypyrrole are formed at the interface between the dielectric layer and the cathode layer, electrons are restrained from flowing to the anode side due to traveling beyond the energy barrier between dielectric layer and conducting polymer layer, or passing through the impurity level and defects in the dielectric layer 3.

A comparison of Examples 1 and 2 with Examples 4 and 5 shows that the second polymer film made of a material with a work function larger than that of the conducting polymer by 0.2 eV or more can reduce the leakage current further.

The smaller leakage current of Example 1 than those of Comparative Examples 2 and 3 shows that the polymer films of the two-layer structure can reduce the leakage current further.

Temperature Load Test

The capacitors fabricated in Examples 1 to 5 and Comparative Examples 1 to 3 are subjected to a temperature load test. One hundred capacitor elements of each type are subjected to the test.

The leakage current is measured at a temperature of 150° C. by applying a voltage of 3.0 V, and the average of the 100 capacitor elements of each type is calculated. The leakage current values measured 30 minutes after the application of the measurement voltage are shown in Table 2 by indicating the leakage current of Comparative Example 1 as 100.

TABLE 2

|  | First Polymer Film (Water Soluble) | | Second Polymer Film (Non-Water Soluble) | | | Leakage |
| --- | --- | --- | --- | --- | --- | --- |
|  |  | Work Function (eV) |  | Work Function (eV) | Capacitance (Rate) | Current (Rate) |
| Example 1 | PVA | 6.2 | PVCz | 5.6 | 100 | 81 |
| Example 2 | PVA | 6.2 | 9,9-octylfluorene-stilbene-triphenylamine copolymer | 5.4 | 100 | 83 |
| Example 3 | PEG | 6.0 | PVCz | 5.6 | 100 | 83 |
| Example 4 | PVA | 6.2 | polyacethylene | 5.1 | 100 | 86 |
| Example 5 | PVA | 6.2 | polydiacetylene | 5.2 | 100 | 85 |
| Comparative Example 1 | — | — | — | — | 100 | 100 |
| Comparative Example 2 | — | — | PVCz | 5.6 | 100 | 95 |
| Comparative Example 3 | PVA | 6.2 | — | — | 100 | 93 |

As Table 2 shows, the capacitors of Examples 1 to 5 have lower leakage currents after the temperature load test as well. Accordingly, Examples 1 to 5 can provide capacitors that are highly reliable even under high-temperature and load conditions.

<Examination of Total thickness of First Polymer Film and Second Polymer Film>

Example 6

A solid electrolyte capacitor of Example 6 is fabricated in a similar manner to Example 1 except that the concentrations of PVCz and PVA are adjusted in such a manner that the first and second polymer films have the same thickness and have the total thickness of 5 nm.

Example 7

A solid electrolyte capacitor of Example 7 is fabricated in a similar manner to Example 1 except that the concentrations of PVCz and PVA are adjusted in such a manner that the first and second polymer films have the same thickness and have a total thickness of 50 nm.

Example 8

A solid electrolyte capacitor of Example 8 is fabricated in a similar manner to Example 1 except that the concentrations of PVCz and PVA are adjusted in such a manner that the first and second polymer films have the same thickness and have a total thickness of 1 nm.

Example 9

A solid electrolyte capacitor of Example 9 is fabricated in a similar manner to Example 1 except that the concentrations of PVCz and PVA are adjusted in such a manner that the first and second polymer films have the same thickness and have a total thickness of 100 nm.

Assessment

The capacitance and the value of leakage current of each of the solid electrolyte capacitors fabricated in the above-described examples and comparative examples are measured, and the average of 100 capacitors of each type is calculated for each of the capacitance and the leakage current. The leakage current is measured at room temperature 5 minutes after the application of a voltage of 3.0 V.

Table 3 shows the measurement results. The figures in Table 3 are indices with the capacitance and the leakage current of Comparative Example 1 being 100.

TABLE 3

|  | Film Thickness (nm) | Capacitance (Rate) | Leakage Current (Rate) |
| --- | --- | --- | --- |
| Comparative Example 1 | 0 | 100 | 100 |
| Example 8 | 1 | 100 | 95 |
| Example 6 | 5 | 100 | 90 |
| Example 1 | 20 | 100 | 80 |
| Example 7 | 50 | 95 | 90 |
| Example 9 | 100 | 90 | 95 |

Table 3 shows that the capacitors of Example 1, 6, and 7 have lower leakage currents than those of Comparative Example 1 and Example 8. The capacitor of Example 9 has a lower leakage current but a smaller capacitance than those of Comparative Example 1 and Example 8.

The above-mentioned fact shows that a larger total thickness of the two polymer films (the first and second polymer films) can have an effect to reduce the leakage current but decreases the capacitance.

Accordingly, the total thickness of the two polymer films (the first and second polymer films) is preferably within a range from 5 to 50 nm, and is more preferably within a range from 10 to 30 nm.

<Examination of Ratio of First Polymer Film and Second Polymer Film>

Example 10

A solid electrolyte capacitor of Example 10 is fabricated in a similar manner to Example 1 except that the concentrations of PVCz and PVA are adjusted in such a manner that the PVA has a thickness of 6 nm while the PVCz has a thickness of 14 nm.

Example 11

A solid electrolyte capacitor of Example 11 is fabricated in a similar manner to Example 1 except that the concentrations of PVCz and PVA are adjusted in such a manner that the PVA has a thickness of 14 nm while the PVCz has a thickness of 6 nm.

Example 12

A solid electrolyte capacitor of Example 12 is fabricated in a similar manner to Example 1 except that the concentrations of PVCz and PVA are adjusted in such a manner that PVA has a thickness of 2 nm while the PVCz has a thickness of 18 nm.

Example 13

A solid electrolyte capacitor of Example 13 is fabricated in a similar manner to Example 1 except that the concentrations of PVCz and PVA are adjusted in such a manner that the PVA has a thickness of 18 nm while the PVCz has a thickness of 2 nm.

Assessment

The capacitance and the value of leakage current of each of the solid electrolyte capacitors fabricated in the above-described examples and comparative examples are measured, and the average of 100 capacitors of each type is calculated for each of the capacitance and the leakage current. The leakage current is measured at roam temperature 5 minutes after the application of the rated voltage.

Table 4 shows the measurement results. The figures in Table 4 are indices with the capacitance and the leakage current of Comparative Example 1 being 100.

TABLE 4

| | Thickness (nm) of First Polymer Film (PVA) | Thickness (nm) of Second Polymer Film (PVCz) | Capacitance (Rate) | Leakage Current (Rate) |
|---|---|---|---|---|
| Comparative Example 1 | 0 | 0 | 100 | 100 |
| Example 10 | 2 | 18 | 100 | 88 |
| Example 11 | 6 | 14 | 100 | 84 |
| Example 1 | 10 | 10 | 100 | 80 |
| Example 12 | 14 | 6 | 100 | 85 |
| Example 13 | 18 | 2 | 100 | 89 |

Table 4 shows that the capacitors of Example 1, and 10 to 13 have lower leakage currents than that of Comparative Example 1. The results shown in Table 4 show that the ratio of the thickness of the first polymer film to the thickness of the second polymer film is preferably within a range from 3:7 to 7:3, further preferably within a range from 4:6 to 6:4.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A solid electrolyte capacitor comprising:
an anode body;
a dielectric layer formed on a surface of the anode body;
a first insulating polymer film formed on the dielectric layer and containing a first polymer;
a second insulating polymer film formed on the first polymer film and containing a second polymer that is different from the first polymer;
a conducting polymer layer formed on the second insulating polymer film and containing a conducting polymer that is different from the second insulating polymer; and
a cathode layer formed on the conducting polymer layer, wherein
the first insulating polymer film has a larger work function than that of the conducting polymer layer.

2. The solid electrolyte capacitor of claim 1, wherein the second insulating polymer film has a larger work function than that of the conducting polymer layer.

3. The solid electrolyte capacitor of claim 2, wherein the second insulating polymer film has a larger work function than that of the conducting polymer layer by 0.2 eV or more.

4. The solid electrolyte capacitor of claim 1, wherein the work function of the first insulating polymer film is 6.0 eV or more.

5. The solid electrolyte capacitor of claim 4, wherein a work function of the first insulating polymer film is 7.0 eV or less.

6. The solid electrolyte capacitor of claim 1, wherein the first insulating polymer film mainly contains a water-soluble polymer.

7. The solid electrolyte capacitor of claim 6, wherein the first insulating polymer film mainly contains any of a vinyl polymer material, polyethylene glycol, and a polymer material with a substituent group.

8. The solid electrolyte capacitor of claim 1, wherein the second insulating polymer film mainly contains a non-water-soluble polymer.

9. The solid electrolyte capacitor of claim 8, wherein the second insulating polymer film contains at least one of polyvinyl carbazole, polyvinyl phenol, polyfluorene and a derivative thereof, fluorene copolymer, polyphenylene and a derivative thereof, phenylene copolymer, polyparaphenylene vinylene and a derivative thereof, phenylene vinylene copolymer, polypyridine and a derivative thereof, and pyridine copolymer.

10. The solid electrolyte capacitor of claim 1, wherein the second insulating polymer film has a smaller work function than that of the first insulating polymer film by 0.2 eV or more.

11. The solid electrolyte capacitor of claim 1, wherein the ratio of the thickness of the first insulating polymer film to the thickness of the second insulating polymer film (first polymer film:second polymer film) is within a range from 3:7 to 7:3.

12. The solid electrolyte capacitor of claim 1, wherein the ratio of the thickness of the first insulating polymer film to the thickness of the second insulating polymer film (first polymer film:second polymer film) is within a range from 4:6 to 6:4.

* * * * *